United States Patent Office 3,430,379
Patented Mar. 4, 1969

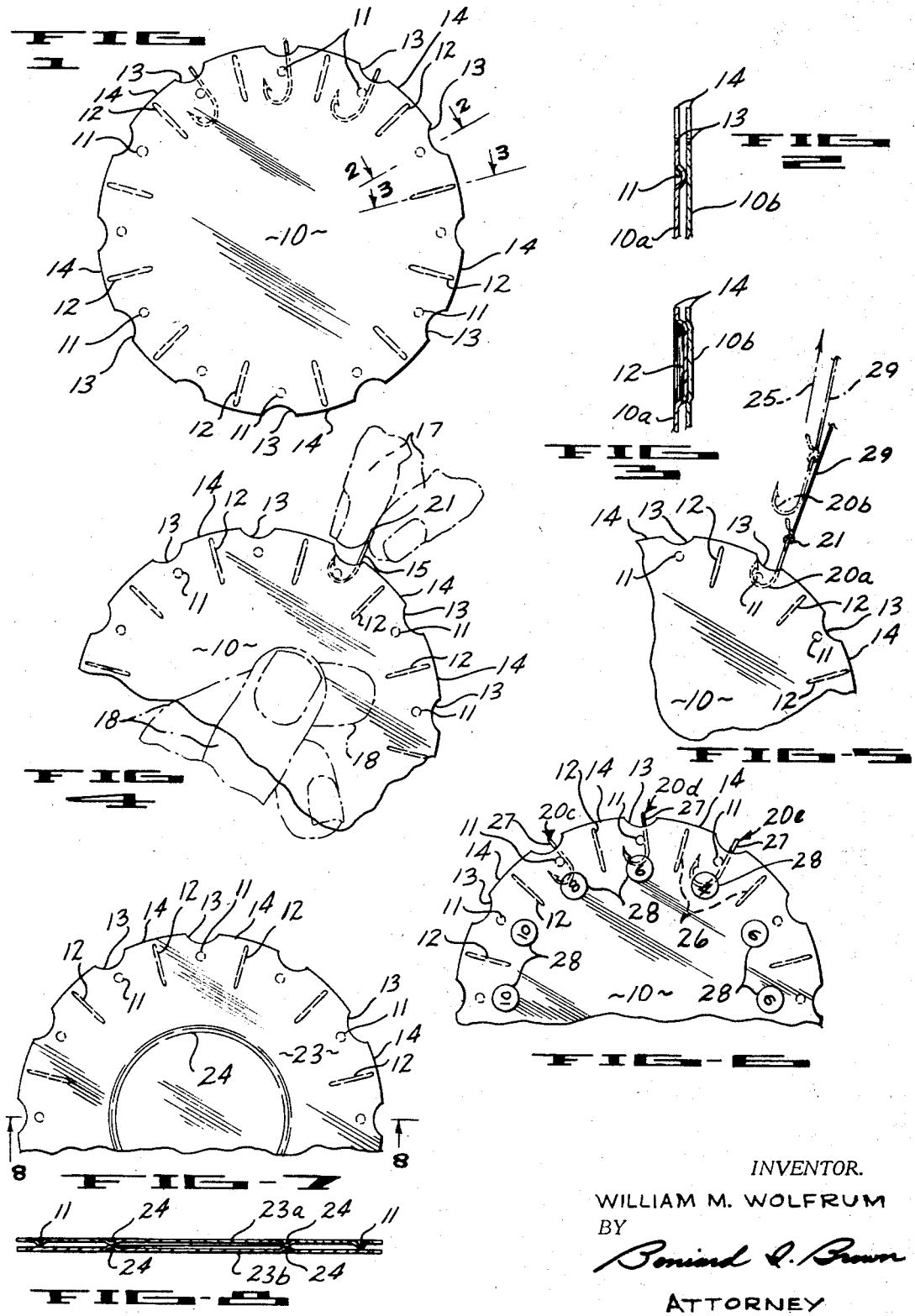

---

3,430,379
HOLDER FOR FISHHOOKS AND THE LIKE
William M. Wolfrum, 14243 Barrydale,
Valinda, Calif. 91744
Continuation of application Ser. No. 493,134, Oct. 5,
1965. This application Feb. 19, 1968, Ser. No.
706,704
U.S. Cl. 43—57.5                                12 Claims
Int. Cl. A01k 97/06

ABSTRACT OF THE DISCLOSURE

A fishing accessory for safely retaining fishhooks including a pair of plastic disc-like means secured together having spaced pockets to receive the hooks and one of the disc-like means being provided with indentations to retain the hook between the disc-like means within the pockets.

---

This application is a continuation of application Ser. No. 493,134, filed Oct. 5, 1965, now abandoned.

The present invention relates generally to fishing accessories; more particularly, the invention relates to means for retaining fish hooks to provide safe handling while tying a line to any one thereof and for storage and transport in a manner that avoids the danger of snagging the user's fingers, clothing or other articles.

In the prior art, fishhook holders have been provided in which pairs of sheet material have been stapled together and the fishhook forced between the stapled portions thereof. Others have provided grooved magnets to which the hooks would be attracted but from which they would be pulled away by any stress thereon. Still others incorporated compartmented cases arranged with ramps by which the sharp end of the hook was slid out of its compartment as an inner portion of the case was rotated on an axis, so as to be lifted out by the sharp end—a rather dangerous process and one likely to prove saguine.

Other prior fish hook holding means involve flexible pouches with sewn compartments provided to hold hooks. These were rolled up or were so arranged that a cover was folded thereof in matchbook fashion to complete the encasement of the hooks. One form of prior art device was a single pocket fitted over the hook end of the fishing hook.

This invention contemplates a safer, more convenient and more easily stored fish hook holder of a novel configuration which provides the advantages of holding a plurality of hooks, greater ease of access to the hooks and means by which a fishing line may be tied to the hooks while still in the holder.

The novel fish hook holder of this invention is generally circular in form of a plastic and has radial compartment sectors formed between an upper and lower disc by the molding together of the upper and lower disc under heat so as to seal them together on radial separators. These separators are in fact a deformation of one of the discs along a radius line and accomplished by heat, the deformation being inward so as to become fused with the adjacent other disc along portion of the radial line in which the two are thus in contact. As a result radial compartments are formed with a space between upper and lower discs sufficient to receive a fish hook by the barbed or hooked end. The loop end of the hook is then flush with the circumference of the discs. Between each adjacent pair of radial separators a finger notch is provided so as to provide access to the looped end of the hook for pulling it out or to make tying of a line thereto convenient. A stopping dimple prevents removing the hook without a rotational movement thereof.

It is therefore an object of the present invention to provide a more convenient and safer fish hook holder of novel configuration.

An object of this invention is the provision of a compartmented fish hook holder in which the hook is accessible for tying a line thereto or for other operations without danger of snagging oneself or other objects on the hook.

An object of the invention is to provide a fish hook holder more easily stored with safety and which occupies relatively little space.

Other objects, features and advantages of the present invention will become apparent to those versed in the art from a consideration of the following description, the appended claims and the accompanying drawings, wherein:

FIGURE 1 is a top plan view of an embodiment of a fish hook holder according to the present invention;

FIGURE 2 is a sectional view taken at line 2—2 in FIGURE 1;

FIGURE 3 is a sectional view taken at line 3—3 in FIGURE 1;

FIGURE 4 is a partial plan view showing the holder of FIGURE 1 held in a user's hand while a hook is manipulated by the user's other hand in accordance with the principle of the invention;

FIGURE 5 is a fragmentary view of the holder, illustrating the manner of removal of the hook over a stopping dimple, a part of the novel article of the invention;

FIGURE 6 is a partial view of a device according to this invention, showing a form of marking and differential separations to provide space for and identify hooks of different sizes and types;

FIGURE 7 is a partial plan view of a holder according to the invention, showing a central circular limit stop; and FIGURE 8 is a sectional view taken at line 8—8 of FIGURE 7.

Referring to the drawing, FIGURES 1 through 3 show a holder 10 for fishhooks according to the invention which comprises an upper disc 10a and a lower disc 10b. At spaced intervals, not necessarily of uniform separation, a series of dimples 11 are impressed in the upper disc 10a near the periphery 14 thereof. Between each dimple 11 is a short relatively linear radial slotted depression impressed in upper disc 10a near the periphery 14 thereof. Dimples 11 are not fused to the lower disc 10b but slotted depressions 12 providing separator means are fused to lower disc 10b. The fusion may be accomplished along with the slot producing action in one molding operation and after the dimples 11 have been pressed into upper disc 10A. On the same radial line as each dimple 11 in the peripheral edge 14 of both discs 10a and 10b half-moon shaped cutouts or notches are made. As may be seen in FIGURE 6 when hooks such as 20c, 20d and 20e are inserted in the pockets such as 26 formed by the fusion of slots 12 in upper disc 10a to lower disc 10b, the hook eyes 27 extend in the half-moon cutout or notch 13. The hook eyes 27 can thus be grasped in a user's fingers, as shown in FIGURE 4 at 17, with respect to hook 20 and its eye 21. The other hand of the user 18 holds the holder 10.

Dimple 11 in top disc 10a is pressed against bottom disc 10b as may be seen in FIGURE 2. But, since the material of which discs 10a–10b are made is resilient, a sharp pull in the direction of arrow 25 on hook 20, as shown in FIGURE 5, will overcome the pressure of dimple 11 against lower disc 10b. Thereby hook 20 ordinarily held by dimple 11 in the position shown at 20a in FIGURE 5 will be removed as at 20b by the sharp pull on hook 20 after a fishing line 29 has been tied to hook eye 21.

As shown in FIGURES 7 and 8, a groove impression on an inner circumference as at 24 may be molded into and so fuse together an upper and lower disc 23a and 23b similar to 10 and 10b so as to provide an inner limit to how far a hook such as 20 may be inserted into the holder 23 so as to have a hook eye such as 21 easily accessible in the notches 13.

Accordingly there has been shown and described hereinabove a novel fishhook holder such as 10 or 23 wherein radial sector compartments such as 26 are formed in the peripheral areas 14 thereof by fusion of slots such as 12 in an upper disc such as 10a or 23a to a lower disc such as 10b or 23b which may or may not be uniformly spaced. An example of differently spaced compartments to accommodate different sized hooks is shown in FIGURE 6 wherein the different sizes may be identified by markings such as 28 provided therefor. These markings may be printed on or molded into the surface of the discs 10a or 23a. A notch 13 provides finger access to the hook eye as at 21 or 27. Between each separator groove 12 a dimple 11 is positioned. Dimple 11 is only in top disc 10a or 23a and presses against but is not fused to lower disc 10b or 23b so as to provide a stop for the barbed end 22 of hook 20 (FIGURE 4) to prevent injury in handling the hooks. Thus chldren learning the mysteries of fishing can handle the hooks safely and securely to tie fishing lines thereto. The fisherman can keep the holder in a pocket without fear.

Those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art.

The inventor claims:

1. A fishhook holder comprising: a first relatively flat disc-like means; a second disc-like means, similar to said first disc-like means, having spaced dimple-like indentations therein near the periphery thereof; thin elongated depressions between each of said dimple-like indentations, said indentations and said depressions extending on surface of said second disc-like means; said thin elongated depressions of said first means being assembled with and facing said first disc-like means and being fused thereto, to form sector-shaped pockets between said first and second disc-like means so fused together said dimple-like indentations merely pressing upon the surface of said second disc-like means; and notches cut in each said sector-shaped pocket at the edge of said disc-like means between said fused together depressions, said notches being opposite said dimple-like indentations, whereby fishhooks may be inserted in said sector-shaped pockets for storage with the barbs thereof in said pockets, said dimple-like indentation pressing against said second means forming a stop against pulling said hook from said pocket over said dimple-like indentation without considerable force.

2. A fishhook holder according to claim 1, wherein a circular depression is formed in at least one of said disc-like means near the center thereof and fused to the other of said disc-like means so as to provide an inner limit stop for the insertion of said fish hooks therein.

3. A fishhook holder according to claim 1, wherein both said disc-like means include circular depressions formed on an inner diameter thereof and being fused together on said circular depressions so as to provide a limit stop for the insertion of fish hooks in said holder.

4. A fishhook holder according to claim 1, wherein said thin elongated depressions are uniformly spaced.

5. A fishhook holder according to claim 1, wherein said thin elongated depressions are spaced at predetermined different radial distances apart so as to provide for the insertion of different sized hooks in said sector-shaped pockets.

6. A fishhook holder according to claim 1, wherein said notches are half-moon shaped.

7. A fishhook holder comprising: upper and lower disc-like means; separator means in said upper disc-like means spaced apart about and near the periphery thereof; dimples in said upper disc-like means between each adjacent pair of separator means; and said upper and lower disc-like means being fused together on said separator means so as to form a disc-like array of pockets adapted to receive barbed portions of fish hooks insertable in said pockets from the periphery of said fishhook holder, said dimples pressing upon said lower disc-like means resiliently so as to require force to insert or remove said fish hooks from said pockets past said dimples positioned to retain barbs.

8. A fishhook holder according to claim 7, wherein finger notches are provided in the periphery thereof opposite each said dimple so that the eyes of fish hooks inserted in said pockets may extend therein for tying a fish line thereto safely and for easy gripping thereof with the fingers.

9. A fishhook holder comprising:
two sheets of pliable material such as plastic disposed face to face and having exposed edges,
means joining said sheets to form therebetween a fish hook receiving pocket which opens between said edges and is bounded along two opposite sides by spaced lines of juncture between said sheets extending transversely of said edges,
said pocket being dimensioned to receive the barbed end of a fish hook to a depth wherein the eye of the hook is exposed just beyond said edges,
one of said sheets having a dimple on its inner surface adjacent the open edge of said pocket and located between said lines of juncture, and
said dimple being disposed in resilient seating contact with the opposing sheet, whereby said dimple is located in the path of movement along which moves the barbed end of the fish hook contained in said pocket when said hook is withdrawn from said pocket and said dimple blocks removal of said hook from said pocket until the withdrawal force exerted on said hook is sufficient to separate said dimple from said opposing sheet.

10. A fishhook holder according to claim 9, and further including a fish hook positioned in said pocket to a depth wherein the eye of the hook is exposed just beyond said edges.

11. A fishhook holder comprising:
two sheets of pliable materials such as plastic disposed face to face and having exposed edges,
means joining said sheets at intervals along said edges along spaced lines of juncture extending transversely of said edges to form between the adjacent juncture lines fish hook receiving pockets which open between said edges,
each pocket being dimensioned to receive a fish hook in such manner that the eye of the hook is exposed just beyond said edges,
one sheet having a dimple on its inner surface within the open edge of each pocket and located between the adjacent juncture lines which define the respective pocket, and
each dimple being disposed substantially immediately adjacent to the opposing sheet, whereby each dimple is located in the path of movement along which moves the fish hook contained in its respective pocket when the hook is removed from the pocket and each dimple blocks removal of a hook from its respective pocket until the withdrawal force on the hook is sufficient to separate the respective dimple from said opposing sheet.

12. A fishhook holder according to claim 11, and further including a fish hook positioned within each pocket to a depth wherein the eye of the respective hook is exposed just beyond said edge.

References Cited

UNITED STATES PATENTS

| | | | |
|---|---|---|---|
| 1,436,160 | 11/1922 | Foedisch et al. | 206—66 |
| 2,371,517 | 3/1945 | Groulx | 43—57.5 |
| 2,702,442 | 2/1955 | Wallen | 43—57.5 |

HUGH R. CHAMBLEE, *Primary Examiner.*